(12) United States Patent
Takada et al.

(10) Patent No.: US 7,959,997 B2
(45) Date of Patent: Jun. 14, 2011

(54) POLYESTER RESIN AND HEAT AND PRESSURE RESISTANT PLASTIC BOTTLE

(75) Inventors: Makoto Takada, Matsudo (JP); Toshio Imai, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 506 days.

(21) Appl. No.: 11/990,266

(22) PCT Filed: Sep. 6, 2006

(86) PCT No.: PCT/JP2006/317606
§ 371 (c)(1),
(2), (4) Date: Feb. 11, 2008

(87) PCT Pub. No.: WO2007/034676
PCT Pub. Date: Mar. 29, 2007

(65) Prior Publication Data
US 2008/0274318 A1    Nov. 6, 2008

(30) Foreign Application Priority Data
Sep. 21, 2005 (JP) .................................. 2005-273614

(51) Int. Cl.
*B32B 1/02* (2006.01)
*B32B 1/08* (2006.01)
(52) U.S. Cl. ...................... 428/35.7; 428/34.1; 428/34.2; 428/35.9; 428/36.9; 428/348
(58) Field of Classification Search ................. 428/34.1, 428/34.2, 35.7, 35.9, 36.9, 348
See application file for complete search history.

(56) References Cited

U.S. PATENT DOCUMENTS
4,318,489 A * 3/1982 Snyder et al. ............... 215/375
6,320,014 B1 * 11/2001 Takahashi et al. ........... 528/194

FOREIGN PATENT DOCUMENTS

| | | |
|---|---|---|
| JP | A 55-3426 | 1/1980 |
| JP | A 63-142028 | 6/1988 |
| JP | A 04-309521 | 11/1992 |
| JP | A 07-67732 | 3/1995 |
| JP | A 07-267235 | 10/1995 |
| JP | A 08-73611 | 3/1996 |
| JP | A 11-21337 | 1/1999 |
| JP | 2001-150522 | 6/2001 |
| JP | A 2003-221437 | 8/2003 |
| JP | A-2006-45555 | 2/2006 |

* cited by examiner

*Primary Examiner* — Marc A Patterson
(74) *Attorney, Agent, or Firm* — Oliff & Berridge, PLC

(57) ABSTRACT

This invention is intended to improve the heat resistance of PET bottles from a material aspect. A technical problem of this invention is to find a polyester resin which is suitable for heat and pressure resistant plastic bottles and which does not eat into productivity and is available at a low cost. The object of this invention is to provide a heat and pressure resistant plastic bottle that can be manufactured at a low cost and has pressure resistance at a high temperature and high impact strength. The means of fulfilling this object is a polyester resin comprising a major part of ethylene terephthalate units and containing at least one of minor copolymerizable components selected from a group consisting of isophthalic acid, cyclohexane dimethanol, and diethylene glycol, wherein three minor copolymerizable components have total content less than 3 mol. %.

3 Claims, 3 Drawing Sheets

[Fig. 1]
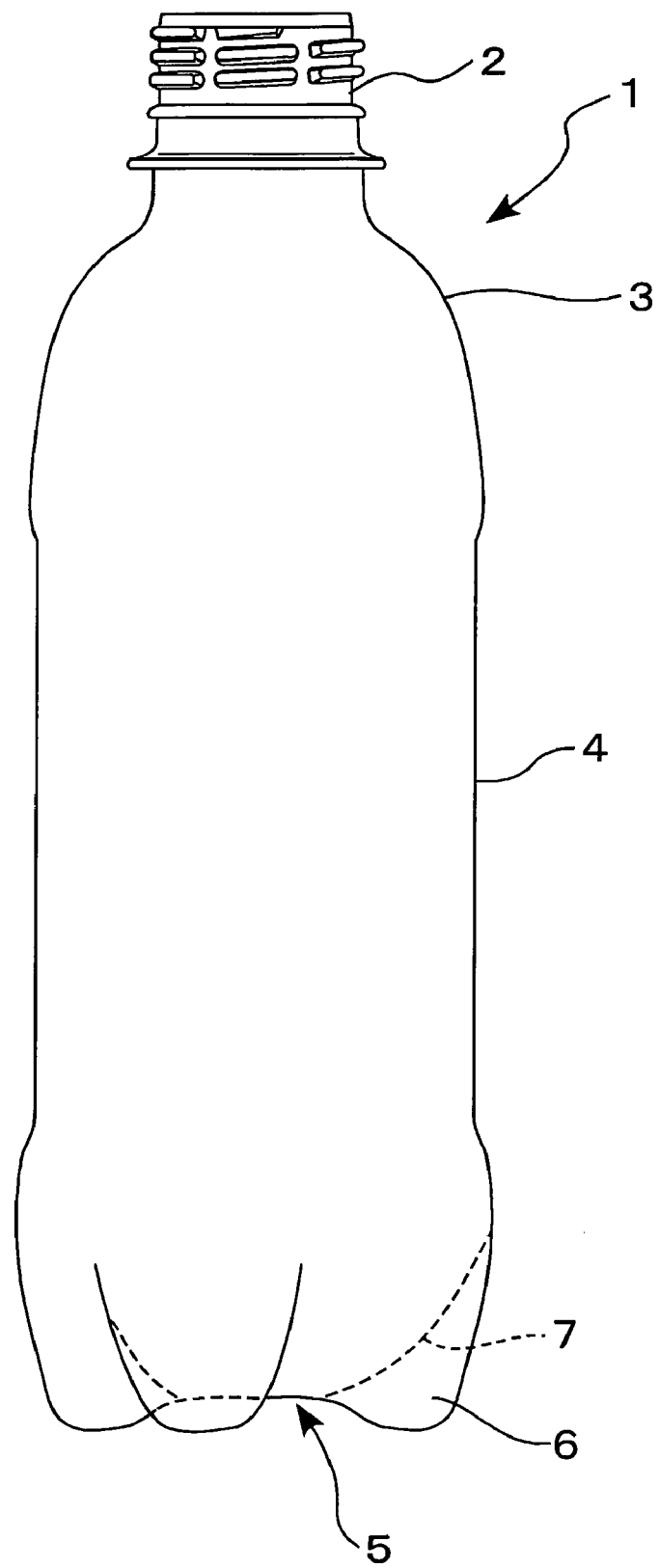

[Fig. 2]
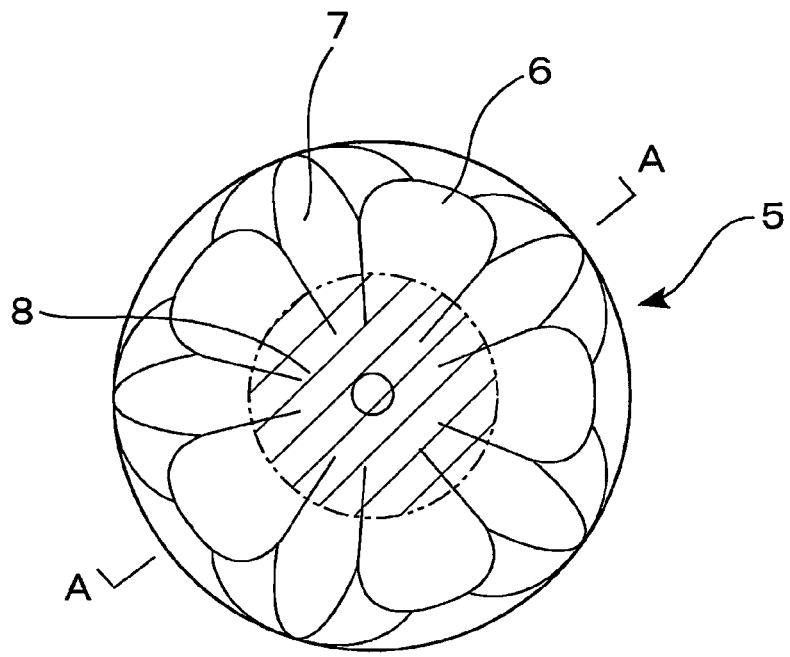
[Fig. 3]
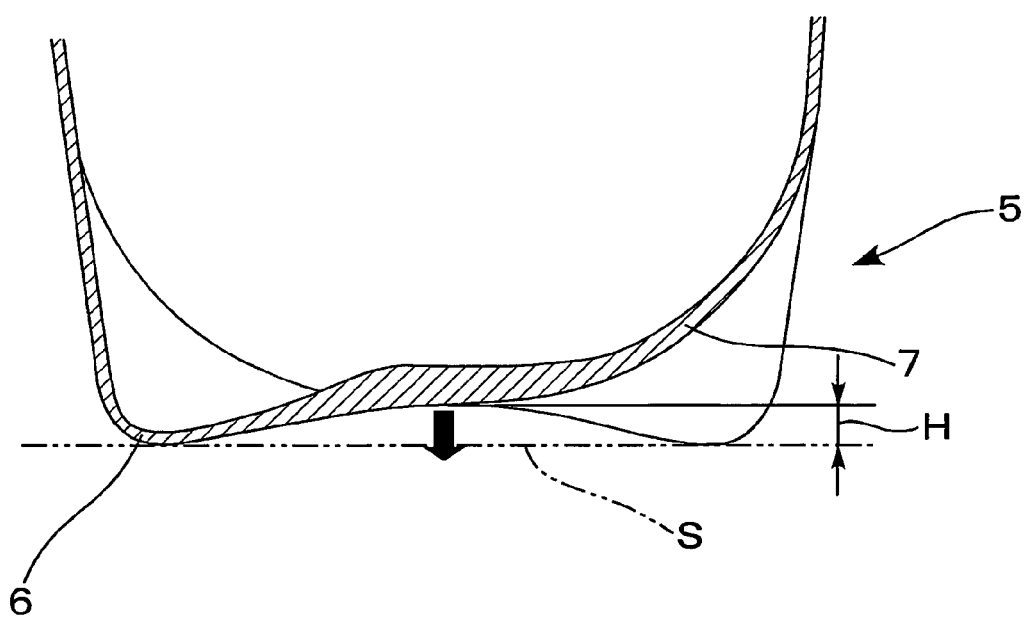

[Fig. 4]
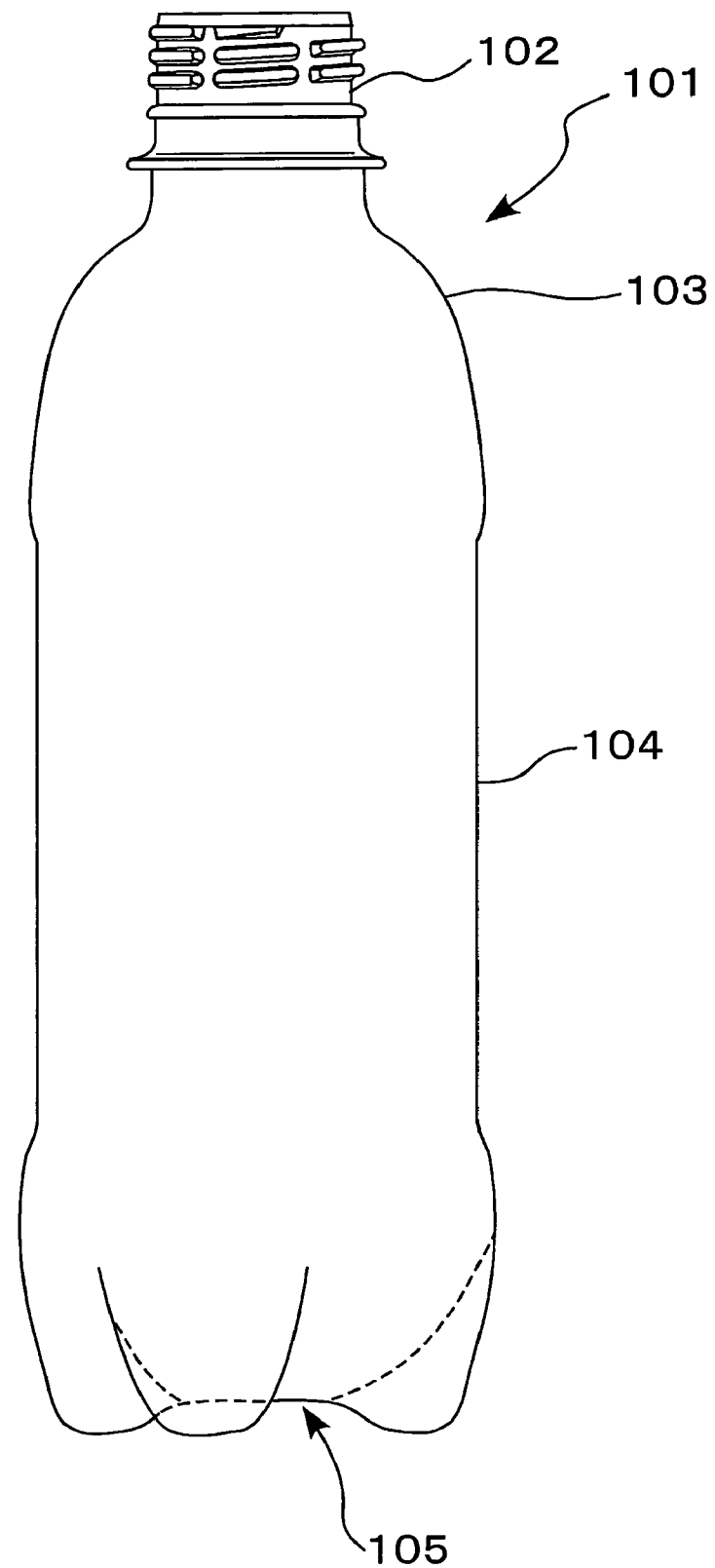

POLYESTER RESIN AND HEAT AND PRESSURE RESISTANT PLASTIC BOTTLE

TECHNICAL FIELD

This invention relates to a polyester resin and a heat and pressure resistant plastic bottle made of this polyester resin and used to put therein mainly a carbonated drink containing a fruit juice.

BACKGROUND ART

In recent years, biaxially drawn, blow molded bottles made of a polyester resin are in use as the containers for tea, juices, and other drinks. Among these bottles, polyethylene terephthalate resin bottles (hereinafter referred to as the PET bottles) are widely in use as the containers for drinks because the PET bottles have various advantages, including a high gas barrier property, high transparency, toughness that prevents bottles from being broken when they fall from some height, a non-adsorbing property that prevents the odor of the contents from being adsorbed to the bottle, and/or non-smelling property indicating that the bottles have no smell of themselves.

Carbonated drinks are put in pressure resistant PET bottles, such as described in Patent Document 1. The bottom of these bottles has plural projected feet and a so-called petaloid shape. FIG. 4 shows a representative example of the pressure resistant PET bottle. The bottle 101 comprises a neck 102, a shoulder 103, a cylindrical body 104, and a bottom 105 in a petaloid shape. This bottle is protected against deformation caused under a pressurized condition.

Meanwhile, in the applications requiring pasteurization at a high temperature, as in the cases of the drinks having a carbonate component, such as the carbonated drinks containing fruit juices, the bottles are filled with the contents and the neck of each bottle is closed with a cap by screw engagement. Then, the contents of the bottle are pasteurized with hot water shower at a temperature in the range of 60-70 deg C. During this operation, the bottle inside becomes highly pressurized at the high temperature, and a high pressure is placed on the bottom. Under this condition, there often occurs the so-called bottom sag, i.e., the deformation in the petaloid shaped bottom that can give damage to the ability of the bottle to stand upright.

Thus, the so-called heat and pressure resistant plastic bottles having pressure resistance at high temperatures are utilized for applications to carbonated drinks containing fruit juices. Patent Document 2 describes a bottle in which heat resistant property of the bottom has been improved by heat-treating the bottom and a nearby area to increase the degree of crystallization. Double blow-molded bottles described in Patent Document 3 can also be used as the heat and pressure resistant plastic bottles.

[Patent Document 1] Published patent application JP1995-267235
[Patent Document 2] Published patent application JP2001-150522
[Patent Document 3] Published examined patent application JP1995-67732

Problems to be Solved by this Invention

However, in the case of the above-described method of heat-treating the bottom and a nearby area to increase the degree of crystallization and to improve the heat resistant property of the bottom, this method requires a heat treatment period and a higher production cost. In addition, if non-drawn portion of a PET resin bottle is thermally crystallized, there arises a crucial problem of a significant drop in the impact resistant strength of the bottom. There is still another problem of a higher production cost caused by many process steps in the case of double blow molding process.

This invention is intended to improve the heat resistance of PET bottles from a material aspect. A technical problem of this invention is to find a polyester resin which is suitable for heat and pressure resistant plastic bottles and which does not eat into productivity and is available at a low cost. The object of this invention is to provide a heat and pressure resistant plastic bottle that can be manufactured at a low cost and has pressure resistance at a high temperature and high impact resistant property.

Means of Solving the Problems

The invention relates to a polyester resin. One embodiment for carrying out the invention is a polyester resin comprising a major part of ethylene terephthalate units and containing at least one of minor copolymerizable components selected from a group consisting of isophthalic acid, cyclohexane dimethanol, and diethylene glycol, wherein three minor copolymerizable components have total content less than 3 mol. %.

The polyester resin comprising a major part of ethylene terephthalate units (hereinafter referred to as a PET resin) is manufactured mainly by polycondensing ethylene glycol (hereinafter referred to as EG) with terephthalic acid (hereinafter referred to as TPA). Depending on the purpose of use, minor parts of copolymerizable components, such as isophthalic acid (herein after referred to as IPA), cyclohexane dimethanol (hereinafter referred to as CHDM), and diethylene glycol (hereinafter referred to as DEG), may be utilized as third components in some cases where it is intended to improve flexibility of the PET resin and to control the speed of crystallization. If IPA, CHDM, or DEG is added, the PET resin tends to have a lower glass transition temperature, depending on the amount of addition.

Even if the above-described DEG is not added as a copolymerizable component, the PET resin often contains DEG as a result of side reactions involved in polymerization.

In an embodiment, the three minor copolymerizable components of IPA, CHDM, and DEG added or by-produced from side reactions have total content less than 3 mol. %. An increase in the content of these three components usually decreases the glass transition tem$_p$erature, but this decrease can be limited to a certain extent by keeping the total content at a level less than 3 mol %. Thus, the PET resin can restore satisfactory heat resistance originally owned by this resin, without giving damage to moldability, mechanical property, and impact resistant strength of the resin. At the total content of 3 mol % or more, bottom deformation would become prominent under a pasteurization condition using hot water shower at 65 deg C for 10 min for cold spots, as required especially for carbonated drinks containing fruit juices. In that case, other countermeasures have to be taken, such as above-described thermal crystallization treatment of the bottom or a double blow molding process.

Note: PET bottles are filled with a carbonated drink containing a fruit juice at a low temperature of 20 deg C or less and are sealed respectively with a cap. Then, the bottles are put in a pasteurizer in an upright position, and are pasteurized by hot water shower at a temperature in the range of 60 to 70 deg C. This temperature range corresponds to a condition under which the bottles at the cold spots are heated to 65 deg C for 10 min. Each cold spot is set at 2 mm above the lowest point of the center of a bottle (i.e., the central bottom portion) where the contents remain at the lowest temperature.

The PET resin containing no minor copolymerizable component has a glass transition temperature of about 80 deg C. If the total content of the above-described three minor copolymerizable components is in a range of 1 to 5 mol %, an increase in the content by 1 mol % lowers the glass transition temperature by about 1 deg C. A change of 1 deg C. in the glass transition temperature may seem insignificant, but in reality this change would have a large effect on the deformability of bottom when deformation is caused by an increase in internal pressure. This is because carbonated drinks containing a fruit juice is heated by hot water shower to a temperature in the range of 60-70 deg C., which is close to the above-described glass transition temperature and because the central bottom portion of a PET bottle is never drawn or only negligibly drawn in the biaxial drawing and blow molding operation so that there is no progress of drawing and crystallization in this portion, thus resulting in low heat resistance, as compared to the body and other portions of the bottle.

An embodiment comprises that, in the invention of claim 1, three minor copolymerizable components have total content in the range of 1 to 2 mol. %.

The decrease in the glass transition temperature can be controlled more sufficiently by setting the total content of three minor copolymerizable components at 2 mol % or less. Problems arise if the total content is set at a level less than 1 mol %. For example, preforms may become cloudy when they are injection molded. At the time of biaxial drawing and blow molding operation, there may be a decrease in drawability.

An embodiment comprises a titanium series catalyst used for polymerization.

A titanium series polymerization catalyst makes it possible for the PET resin to be industrially manufactured relatively easily so as to have the total content of minor copolymerizable components in the range of 1 to 2 mol %.

Embodiments relate to a heat and pressure resistant plastic bottle. An embodiment comprises a heat and pressure resistant plastic bottle, which is a biaxially drawn, blow molded polyester resin bottle having a cylindrical body and a pressure resistant bottom, wherein said polyester resin comprises a major part of ethylene terephthalate units and contains at least one of minor copolymerizable components selected from a group consisting of isophthalic acid, cyclohexane dimethanol, and diethylene glycol, and wherein three minor copolymerizable components have total content less than 3 mol. %.

The heat and pressure resistant plastic bottles having the above-described construction are mainly filled with contents, such as carbonated drinks containing a fruit juice. A cap is fitted around the neck by screw engagement. Then the bottles are pasteurized by showering hot water at a temperature in the range of 60 to 70 deg C. If the total content of minor copolymerizable components is set at a level less than 3 mol %, then the decrease in glass transition temperature can be limited to a certain extent. There can be provided a heat and pressure resistant plastic bottle, which can be used for applications to carbonated drinks containing fruit juices, while maintaining necessary impact resistant strength.

As the bottom shapes intended for pressure resistance, there may be mentioned the above-described petaloid shape and a shallow-bowled champagne glass shape obtained by caving in the central part of the bottom underside to form a semi-spherical dome.

An embodiment comprises the three minor copolymerizable components having a total content in the range of 1-2 mol %.

Under the above-described construction, the glass transition temperature can be well prevented from decreasing by setting the total content of three minor copolymerizable components at 2 mol % or less. It is preferred that the total content is 1 mol % or more because at a level less than 1 mol %, preforms may become cloudy during injection molding or drawability may be low when the preforms are biaxially drawn and blow molded into bottles.

An embodiment comprises the bottom having a petaloid shape, a crystallization degree of 20% or less and a thickness of 1.5 mm or more for a circular area having a diameter of up to 30 mm centered around the central axis of bottom underside.

Under the above-described construction, the bottom in a petaloid shape can effectively control deformation of the bottom caused by internal pressure, and can maintain good standing and grounding abilities. A circular area having a diameter of 30 mm, centered around the central axis of bottom underside, is never or only negligibly drawn. The bottom would have a practically sufficient strength at a crystallization degree of 20% or less specified for this area. This area is where the so-called "bottom sag" takes place. When internal pressure of the bottle has risen, this area expands and deforms until the bottom underside sags even below the grounding plane. With help from the thickness of 1.5 mm or more at this area, and with help from increased heat resistance of the PET resin, the bottom deformation can be effectively controlled under high-temperature and high-pressure conditions.

The degree of crystallization of the PET resin is obtained by measuring density of the resin according to the JIS K7112 D method and calculating the degree from the following equation:

$$X=(dc(d-da)/d(dc-da)\times 100$$

where $X$ is degree of crystallization in %; $d$ is density of a sample in g/cm$^3$; $da$ is density of completely amorphous PET (1.335 g/cm$^3$); and $dc$ is theoretical density of completely amorphous PET (1.501 g/cm$^3$).

Effects of the Invention

According to the above embodiments, the decrease in glass transition temperature caused by the increased content of three minor copolymerizable components can be limited to a certain extent. The PET resin can restore satisfactory heat resistance originally owned by this resin, without giving damage to moldability, mechanical property, and impact resistant strength of the resin.

The decrease in the glass transition temperature can be controlled more sufficiently by setting the total content of minor copolymerizable components at 2 mol % or less.

The PET resin having the total content of minor copolymerizable components in the range of 1 to 2 mol % can be industrially manufactured relatively easily.

The decrease in glass transition temperature can be limited to a certain extent if the total content of minor copolymerizable components is set at a level less than 3 mol %. There can be provided a heat and pressure resistant plastic bottle, which can be used for such applications as carbonated drinks containing fruit juices, while maintaining necessary impact resistant strength.

The glass transition temperature can be well prevented from decreasing by setting the total content of three minor copolymerizable components at 2 mol % or less.

The bottom has a petaloid shape, a crystallization degree of 20% or less and a thickness of 1.5 mm or more for a central area of the bottom underside. These set values are effective in controlling deformation of the bottom caused by internal pressure and in maintaining good standing and grounding abilities. As a result, the "bottom sag" of the underside can be more effectively prevented from occurring.

BRIEF DESCRIPTION OF THE DRAWINGS

FIG. 1 is a front elevational view of the bottle in one embodiment of this invention.

FIG. 2 is a bottom plan view of the bottle of FIG. 1

FIG. 3 is a vertical section of the bottom and the nearby area, taken from line A-A shown in FIG. 2.

FIG. 4 is a front elevational view showing an example of the heat

EXPLANATION OF CODES

1. Bottle
2. Neck
3. Shoulder
4. Body
5. Bottom
6. Foot
7. Valley wall portion
8. Area
101. Bottle
102. Neck
103. Shoulder
104. Body
105. Bottom
S. Grounding plane
H. Bottom height

A PREFERRED EMBODIMENT OF THE INVENTION

This invention is further described with respect to a preferred embodiment, now referring to the drawings. FIGS. 1 to 3 show the heat and pressure resistant plastic bottle in one embodiment of this invention. FIG. 1 is a front elevational view of the bottle of this invention. FIG. 2 is a bottom plan view, and FIG. 3 is a vertical section of the bottom 5 and a nearby area thereof, taken from line A-A indicated in FIG. 2. This bottle is a biaxially drawn, blow molded product made of a PET resin, and comprises a neck 2, a shoulder 3, a cylindrical body 4, and a bottom 5. The bottle has a nominal capacity of 1.5 L, an entire height of 303.6 mm, and a body diameter of 92.5 mm. The neck is whitened by thermal crystallization treatment. The PET resin to be used comprises a major part of ethylene terephthalate units, which have been obtained by polymerizing EG and TPA in the presence of a titanium series catalyst, and contains minor copolymerizable components in the total content of 1.9 mol %.

The bottom 5 has a petaloid shape in which five feet 6 are disposed at an equiangular space and are projected from the central area of bottom underside. A valley wall portion 7 is disposed at an axisymmetric position of each foot 6, and is sandwiched between adjacent two feet 6. The bottom 5 has a bottom height H of about 4.5 mm, and this height denotes a height from the grounding plane S to the central underside position of the bottom 5 (See FIG. 3). A hatched area 8 with a diameter of 30 mm in the bottom plan view of FIG. 2, centered around the central axis of the bottom underside, is an area never drawn or only negligibly drawn in the biaxial drawing and blow molding. This area 8 has a degree of crystallization of 20% or less and a thickness of 1.5 mm or more.

The bottles 1 in the above-described embodiment were subjected to a pasteurization test under conditions suitable for a carbonated drink containing a fruit juice. During the test, the bottom 5 was observed for any change. Bottom height H (See FIG. 3) was measured right after the test to evaluate the usefulness of the bottles 1. As a comparative example, the same test was carried out for the PET bottles containing a minor copolymerizable component at a level of 3.0 mol %. The bottles in the comparative example were different from the bottles 1 in the level of content of the minor copolymerizable component. This copolymerizable component is DEG mixed with the PET resin, the main raw material for the bottles of both the embodiment of this invention and the comparative example. Therefore, IPA and CHDM are not contained in both cases.

(1) Test Conditions

The moisture content of bottles was adjusted in a humidification chamber so that the bottles have a moisture percentage of about 5,000 ppm in the central area of the bottom underside. The bottles were then filled with a carbonated drink containing a fruit juice and a carbonating component in an amount of about 2.5 gas volumes (See Note below). Head space was 29 ml after the filling of contents. The bottles were sealed with respective caps, and were pasteurized by hot water shower under conditions corresponding to temperatures of 64, 65, and 66 deg C. held for 10 min at cold spots. Note: The gas volume is a unit showing carbon dioxide content in drinks, usually utilized in the soft drink industry. It is a ratio of carbon dioxide volume dissolved in a drink to the volume of the drink, measured under standard conditions (1 atmospheric pressure and 0 deg C.).

(2) Test Results

Table 1 shows results of bottom height measurements after the pasteurization test, along with the content of the minor copolymerizable component in the resin, and glass transition temperature (Tg). By the indications of "bottom sag" in the table, it is meant that the central underside area of the bottom 5 has sagged even below the ground plane S, as shown by a black arrow in FIG. 3. The higher the moisture percentage, the lower glass transition temperature would result and the bottom would deform to a greater extent. A moisture percentage of about 5,000 pm used in the test for the central area of the bottom underside is considerably higher than used in actual pasteurization to evaluate bottom deformation under a severe condition.

TABLE 1

| | Content of a minor component (mol %) | Tg (deg C.) | Bottom height (mm) after pasteurization shower test (n = 5) | | |
| --- | --- | --- | --- | --- | --- |
| | | | 64 deg C., 10 min | 65 deg C., 10 min | 66 deg C., 10 min |
| Embodiment of this invention | 1.9 | 80 | 2.46 (min. 1.84) | 1.78 (min. 1.41) | Bottom sag in 3/5 |
| Comparative example | 3.0 | 79 | 2.42 (min. 1.98) | Bottom sag in 1/5 | — |

Note
1) Each parenthetical figure shows a minimum level of height.
2) Bottom sag indicates a state of bottom in which the central area has expanded and sagged downward.

As found from Table 1, in which the embodiment of this invention is compared with the comparative example, the effect of glass transition temperature Tg of the PET resin in use is directly reflected on the pasteurizing temperature at which bottles can be treated. If the content of the minor copolymerizable component is set at 3 mol % or more, then some samples of bottles showed bottom sag under pasteurizing conditions in which the bottles were heated to 65 deg C. for 10 min at cold spots. These bottles were not commercially usable. Although the bottom height H drops from a height of about 4.5 mm measured before the test, the action and effect of this invention were proved from the test by setting the content of the minor component at 2 mol % or less, because at this level, the bottom sag could have been prevented from occurring without fail. The abilities to stand upright and contact the ground plane fell within practical ranges. There was no problem in the adaptability to production line.

This invention has been described with respect to a preferred embodiment and to action and effect of this invention. However, it is noted here that this invention should not be construed as limitative in any way to the above-described embodiment. The bottle is not limited to a special size, but this invention can also be applied to relatively small bottles, such as 500 ml or 350 ml. The bottom shape is not limited to a petaloid shape, but can be in a shape of a shallow-bowled champagne glass.

INDUSTRIAL APPLICABILITY

As described above, the PET resin of this invention, among others, is a resin that makes it possible to control the decrease in the glass transition temperature. As such, the resin can be expected to find wide applications of use as the material for heat and pressure resistant plastic bottles in the field of carbonated drinks containing fruit juices.

The invention claimed is:

1. A heat and pressure resistant plastic bottle, which is a biaxially drawn, blow molded polyester resin bottle having a cylindrical body and a pressure resistant bottom, wherein
    a titanium series catalyst is used for polymerization of the polyester resin,
    the polyester resin comprises a major part of ethylene terephthalate units and contains at least one of minor copolymerizable components selected from a group consisting of isophthalic acid, cyclohexane dimethanol, and diethylene glycol,
    three minor copolymerizable components have total content less than 3 mol. %, and
    the bottom has a petaloid shape and a circular area having a diameter of 30 mm centered around central axis of bottom underside with a crystallization degree of 20% or less and a thickness of 1.5 mm or more.

2. The heat and pressure resistant plastic bottle according to claim 1 wherein the three minor copolymerizable components have total content in the range of 1-2 mol. %.

3. The heat and pressure resistant plastic bottle according to claim 1, wherein the bottom has a crystallization degree of less than 20%.

* * * * *